Figure 1:
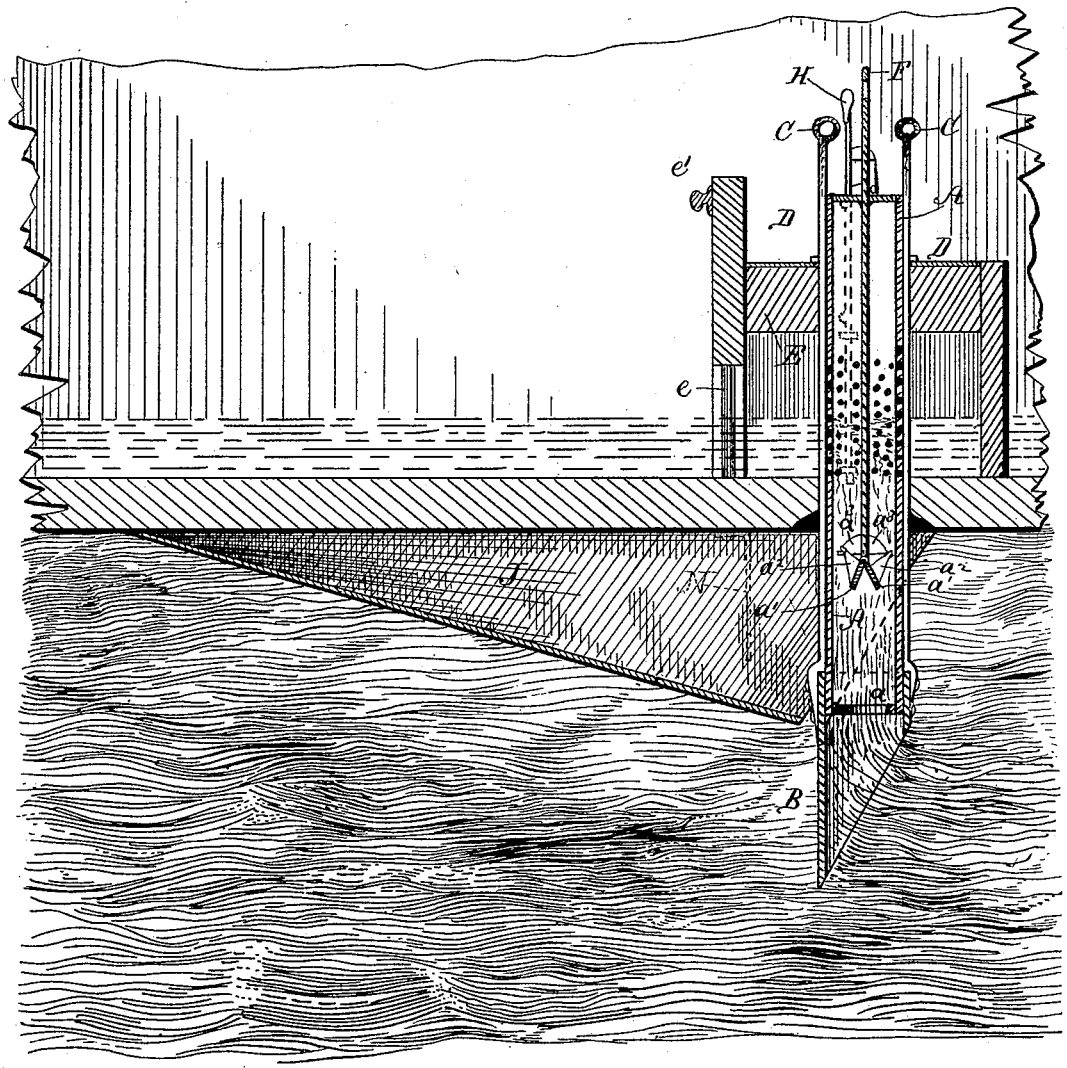

(No Model.) 2 Sheets—Sheet 1.

N. RICHARDSON.
BILGE PUMP.

No. 394,725. Patented Dec. 18, 1888.

Witnesses:
Thos Houghton.
Joseph Sands.

Inventor:
Nathan Richardson
By his atty John S. Duffie (No Model.) 2 Sheets—Sheet 2.
N. RICHARDSON.
BILGE PUMP.
No. 394,725. Patented Dec. 18, 1888.
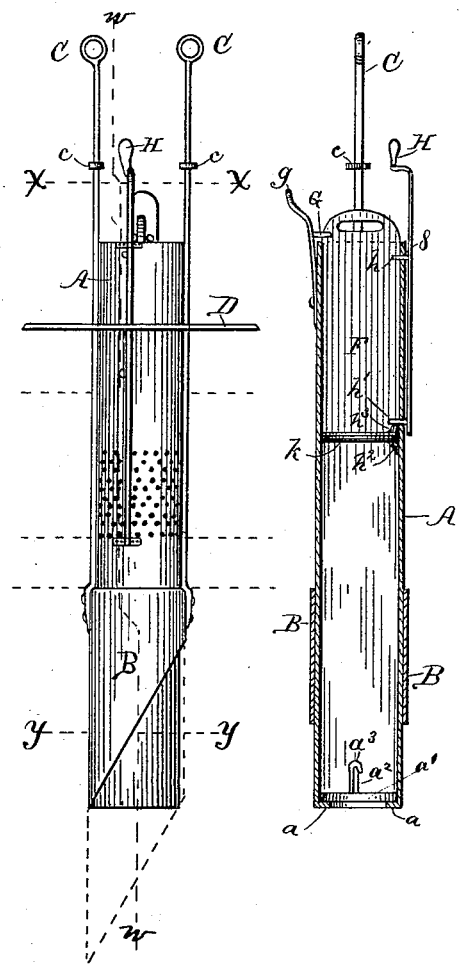
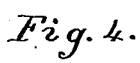
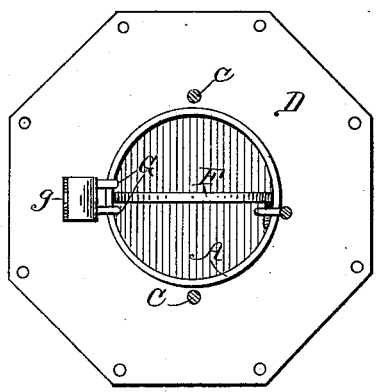
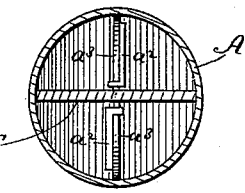
Witnesses:
Thos. Houghton.
Joseph Sands.
Inventor:
Nathan Richardson,
By his atty
John S. Duffie

UNITED STATES PATENT OFFICE.

NATHAN RICHARDSON, OF LITTLE FALLS, MINNESOTA.

BILGE-PUMP.

SPECIFICATION forming part of Letters Patent No. 394,725, dated December 18, 1888.

Application filed March 16, 1888. Serial No. 267,334. (No model.)

*To all whom it may concern:*

Be it known that I, NATHAN RICHARDSON, a citizen of the United States, residing at Little Falls, in the county of Morrison and State of Minnesota, have invented certain new and useful Improvements in the Mode of Removing Bilge-Water from Vessels of all Sizes or Dimensions; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is a new bilge-water pump; and it consists in the novel construction and arrangement of its parts, as hereinafter described, so as to accomplish the object for which it is designed with greater dispatch and certainty than any device heretofore made for the purpose of extracting the bilge-water from vessels of any size or material that move upon water.

The various parts of my said bilge-water pump are shown in the accompanying drawings, in which—

Figure 1 is a sectional elevation of my pump placed in the bottom of a vessel. Fig. 2 is an elevation of my pump removed from the vessel. Fig. 3 is a rear sectional view of Fig. 2, cut on the line *w w*. Fig. 4 is an edge view of the valve-bar provided with the valves and stop-plates. Fig. 5 is a top view of Fig. 2, the same being cut off at the line *x x*. Fig. 6 is a view of the valves and stops, looking down on them through the tube A, said tube being cut off at *y y*.

My invention is described as follows:

A is a round hollow tube of desired diameter and length and of substantial material—such as copper, steel, or gutta-percha—which, when in place, stands upright in and through the bottom of a vessel, which may or may not reach into the water below, the lower end of which is turned in sufficiently to form a shoulder, *a*, against which the valves *a'* on the inside of it may be pressed down and entirely close it up on the bottom, and that portion of it which extends above the vessel is perforated, so that the water inside the vessel may pass into said tube and out of the vessel.

B is a tube just large enough to slide on over said tube A easily, is cut square across at the upper end, and the other cut diagonally downwardly from near the upper end to a point about double its diameter on the front side, regardless of its size. It might vary some from this proportion in the length of the two sides. For instance, if the tube B should be four inches in diameter, the longer side, when cut ready for use, should be nearly eight inches longer than the short side. However, the longer the bevel the greater would be its power. This tube B has fastened to it two rods, C, passing up through the flange D, one attached to its short and the other to its long side, by which rods it is drawn up when not in use, so that no part of it is below the guard J, or the bottom of the boat if the guard is not used. When in use, it is pressed down nearly its whole length into the water below the said guard or bottom of the vessel, with its longest side toward the bow of the vessel, in which position it is firmly held by said rods C until such time as it is desired to draw it up out of the water. This tube may also be made of any suitable material.

D is a flange, to which is firmly attached tube A near its upper end, and which is screwed down on the top of the pump-house E, and some flexible water-tight material is placed under it to prevent leakage, and through which the two rods pass.

F is a flat bar of iron or of other suitable material, as broad as the diameter of the tube A, and of sufficient thickness to make it sufficiently strong for the use to which it is put, and sufficiently narrow that it may pass into said tube. At the lower end of said bar are hinged two valves, *a'*, each a half-circle, which are so arranged that when drawn up a proper distance from the bottom of the tube they fall open, and when they are pressed against flange *a* said tube is entirely closed. They are self-acting, opening when water is passing out of the vessel and closing water-tight when the vessel is not in motion. The said valves are hinged—one on each side of said bar F—and have attached to their upper face arms $a^2$, the extreme ends of which turn over the stops $a^3$, and are thereby prevented from falling close together, but stand at an angle, so that when the water presses up against them they shut upward and close the said tube.

C C are two rods, which pass through the flange D, and are made fast to the tube B below and serve to lower and raise the same to the desired position, and on which small stops $c$ are placed to prevent said rods from being run down too far, and at the point where these rods pass through flange D packing is secured in proper packing-boxes, to prevent leaking and to sustain said rods from dropping down of their own weight.

G are stops held by a spring, $g$, and rest against the upper plate, K, and prevent the said bar F from being drawn up too far or coming out of the tube; but by holding said spring back said bar may be taken entirely out.

H is a pivoted rod, on which are secured two arms, $h\ h'$. The upper one catches under the inclined shoulder $h^2$ on the bar F and holds said bar and valves $a'$ up above shoulder $a$ in the lower end of tube A, and the lower one, $h'$, catches over the upper inclined shoulder, $h^3$, and holds the said bar down and presses said valves down tightly against said shoulder. The said valves $a'$ are self-acting and are pivoted to the flat bar F at its extreme lower end, and are opened and closed by the action of the water upon them—opening when raised from the bottom of the tube when the vessel is in motion and closing when the vessel is at rest.

It would require a considerable blocking up in a thin-bottom vessel to make room to draw up the tube B, that is slid down and drawn up out of the water, so that the water would be quite a depth in the bottom of a vessel before it could run out through perforated holes over the flange D and near the top of the tube; so I have thought best to have the tube A perforated down as low as the inside surface of the bottom of the vessel and leave a gateway, $e$, in the pump-house E at its bottom, so the water can pass in and out through the said perforations. In order to protect the said tube A and the perforations therein, a sliding gate, $e'$, is dovetailed in said gateway, to be opened and closed at will. I place on the bottom of the vessel an iron guard, J, that leaves a hollow place between it and the vessel. The end toward the bow is brought to a point, and it widens as it runs back, leaving a space under it and an opening at the end in front of and nearly underneath the tube A. This iron guard will suck the water from the boat the same as the beveled tube B, and may be used in connection with it. This guard should be very strong and firmly fastened to the bottom of the vessel by heavy screws or bolts, so that it would stand to run through a sand-bar or to run over logs or snags in a river.

When I deem it necessary, and particularly where my pump is to be used on shallow waters, I protect the lower end of the pipe A by a wire screen, and the gateway in the pump-house may be protected in the same way. For river boats and vessels used in shallow waters I use my pump as above described, except the tube B. In such boats I bring the lower end of the tube A no lower down than the lowest surface of the bottom of the boat, and in place of the tube B, I use a bar, N, of spring-steel or other material that is flexible. I fasten one end to the bottom of the boat in front of the tube A, the other end extending downward a short distance into the water, which will create a vacuum and cause the water to run out of tube A. This spring (represented by the dotted lines N) is thus left free, so that when it strikes a bar or other obstruction it is pressed back up against the bottom of the boat and springs back into position when the obstruction is passed over. This bar of spring-steel may be hinged to the bottom of the boat and made to stand straight down by the use of any springing contrivance generally used for such purposes. When said spring is used, the tube A used in such boats may not extend quite to the lowest surface of the same, but room sufficient may be left that enough may be cut out of the bottom to allow the said spring and other material attached to it to bury itself when the boat is aground, passing over a sand-bar or other obstruction; or, instead of taking any portion out of the bottom of the vessel for said spring to bury itself into, pieces of plank may be secured along each side of said spring lengthwise the boat of sufficient length and thickness for the spring to bury itself between. Now, when I use this spring instead of the tube A, I may or may not use the guard J.

Having described my invention, what I claim as new, and desire to secure by Letters Patent, is—

1. A bilge-water pump consisting of the perforated tube A, provided with the shoulder $a$ at its lower end, the short tube B, fitting over said tube A and adapted to slide up and down on the same, rods C, secured to said tube B and adapted to move said tube up and down, bar F, provided with the stop-plate K, inclined shoulders $h^2\ h^3$, and hinge-valves $a'$, having the arms $a^2$ bent over the circular stops $a^3$, said bar, stop-plate, and valves adapted to move up and down in said tube A, and pivoted rod H, having the arms $h\ h'$, adapted to catch under and over the shoulders $h^2\ h^3$ on bar F, substantially as shown and described, and for the purposes set forth.

2. A bilge-water pump consisting of the perforated tube A, provided with the shoulder $a$ at its lower end, the short tube B, fitting over said tube A and adapted to slide up and down on the same, rods C, secured to said tube B and adapted to move said tube up and down, bar F, provided with stop-plate K, inclined shoulders $h^2\ h^3$, and hinge-valves $a'$, having the arms $a^2$ bent over the circular stops $a^3$, said bar, stop-plate, and valves adapted to move up and down in said tube A, substantially as shown and described, and for the purposes set forth.

3. A bilge-water pump consisting of the perforated tube A, provided with the shoulder $a$ at its lower end, the short tube B, fitting over said tube A and adapted to slide up and down on the same, rods C, secured to said tube B and adapted to move said tube up and down, bar F, provided with the stop-plate K, inclined shoulders $h^2$ $h^3$, and hinge-valves $a'$, having the arms $a^2$ bent over the circular stops $a^3$, said bar, stop-plate, and valves adapted to move up and down on said tube A, and stops G, adapted to impinge against the upper face of plate K, and spring $g$, secured to the outer face of said tube A and carrying said stops G, substantially as shown and described, and for the purposes set forth.

4. In a bilge-water pump as above described, the bar F, having secured on its lower end the circular stops $a$, having the stop-shoulder $a^4$, and the valves $a'$, hinged to the lower end of said bar, having the arms $a^3$ turned over said stops and adapted to catch against said stop-shoulders $a^4$, substantially as shown and described.

5. The pump-house E, built around the tube A and secured in the bottom of the vessel to protect said tube, covered with the flange D, and having the grooved gateway $e$, leading to the perforations in said tube, and tongued gate $e'$, fitting in said gateway, substantially as shown and described.

6. The combination of the pump-house E, the flange D, secured on the top of said pump-house, and said pump secured to said flange and passing down through said boat, and guard J, secured to the bottom of the vessel in front of said pump, all substantially as shown and described, and for the purposes set forth.

7. The combination, with the vessel, of the pump-house E, secured in the bottom of the vessel, bilge-water pump, as above described, secured in the bottom of the vessel by means of the flange D, and spring-bar N or guard J, secured to the bottom of the vessel in front of said pump, substantially as shown and described, and for the purposes set forth.

In testimony whereof I affix my signature in presence of two witnesses.

NATHAN RICHARDSON.

Witnesses:
STEPHEN C. VASALY,
LYMAN SIGNON.